US012586074B2

(12) United States Patent
Hirohata et al.

(10) Patent No.: US 12,586,074 B2
(45) Date of Patent: Mar. 24, 2026

(54) MODEL UTILIZATION SYSTEM, MODEL UTILIZATION METHOD, AND COMPUTER PROGRAM PRODUCT

(71) Applicant: KABUSHIKI KAISHA TOSHIBA, Tokyo (JP)

(72) Inventors: Kenji Hirohata, Tokyo (JP); Makihiko Ishitani, Kanagawa (JP); Shotaro Oka, Tokyo (JP); Akira Kano, Kanagawa (JP); Hideaki Uehara, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 161 days.

(21) Appl. No.: 18/503,369

(22) Filed: Nov. 7, 2023

(65) Prior Publication Data

US 2024/0311835 A1 Sep. 19, 2024

(30) Foreign Application Priority Data

Mar. 13, 2023 (JP) ................................. 2023-038918

(51) Int. Cl.
| | |
|---|---|
| *G06Q 20/40* | (2012.01) |
| *G06F 30/20* | (2020.01) |
| *G06Q 20/38* | (2012.01) |

(52) U.S. Cl.
CPC ......... *G06Q 20/4016* (2013.01); *G06F 30/20* (2020.01); *G06Q 20/389* (2013.01)

(58) Field of Classification Search
None
See application file for complete search history.

(56) References Cited

U.S. PATENT DOCUMENTS

| | | | | |
|---|---|---|---|---|
| 11,119,882 B2 * | 9/2021 | Rakshit | .............. | G06F 11/3051 |
| 11,403,541 B2 * | 8/2022 | Thomsen | .............. | G06N 5/048 |

(Continued)

FOREIGN PATENT DOCUMENTS

| | | | | |
|---|---|---|---|---|
| CA | 3238747 | * | 6/2023 | ............. G06Q 40/04 |
| JP | 2020046738 A | | 3/2020 | |

(Continued)

OTHER PUBLICATIONS

K. Singi, et al "Are Software Engineers Incentivized Enough? An Outcome based Incentive Framework using Tokens," 2020 IEEE International Workshop on Blockchain Oriented Software Engineering (IWBOSE), London, ON, Canada, 2020, pp. 37-47. (Year: 2020).*

(Continued)

*Primary Examiner* — Mohammad Z Shaikh
(74) *Attorney, Agent, or Firm* — Maier & Maier, PLLC

(57) ABSTRACT

According to one embodiment, a model utilization system includes a memory and one or more processors. The one or more processors are configured to: perform processing of a distributed ledger configured to store a scenario to be used for analysis of a target system, a digital twin model to be used for the analysis, and data to be input to the digital twin model; calculate a token for an organization that provides the digital twin model to be utilized and an organization that provides the data to be utilized; retrieve, from the distributed ledger, a candidate of the scenario satisfying a user request, a candidate of the digital twin model satisfying the user request, and a candidate of the data satisfying the user request, present the retrieved candidates, and present a token required to use a combination of the retrieved candidates of the digital twin model and the data.

11 Claims, 15 Drawing Sheets

(56) References Cited

U.S. PATENT DOCUMENTS

| | | | |
|---|---|---|---|
| 2016/0247129 A1* | 8/2016 | Song | G06Q 10/20 |
| 2019/0236489 A1* | 8/2019 | Koudal | G06N 20/00 |
| 2019/0340013 A1 | 11/2019 | Cella | |
| 2019/0340467 A1 | 11/2019 | Cella | |
| 2019/0340627 A1 | 11/2019 | Cella | |
| 2019/0340645 A1 | 11/2019 | Cella | |
| 2019/0340686 A1 | 11/2019 | Cella | |
| 2019/0340707 A1 | 11/2019 | Cella | |
| 2019/0340715 A1 | 11/2019 | Cella | |
| 2019/0340716 A1 | 11/2019 | Cella | |
| 2019/0347105 A1 | 11/2019 | Cella | |
| 2019/0354374 A1 | 11/2019 | Cella | |
| 2019/0355031 A1 | 11/2019 | Cella | |
| 2020/0090156 A1 | 3/2020 | Cella | |
| 2020/0090193 A1 | 3/2020 | Cella | |
| 2020/0090228 A1 | 3/2020 | Cella | |
| 2020/0097639 A1 | 3/2020 | Cella | |
| 2020/0097974 A1 | 3/2020 | Cella | |
| 2020/0097988 A1 | 3/2020 | Cella | |
| 2020/0098057 A1 | 3/2020 | Cella | |
| 2020/0098058 A1 | 3/2020 | Cella | |
| 2020/0098059 A1 | 3/2020 | Cella | |
| 2020/0098060 A1 | 3/2020 | Cella | |
| 2020/0098061 A1 | 3/2020 | Cella | |
| 2020/0098062 A1 | 3/2020 | Cella | |
| 2020/0098063 A1 | 3/2020 | Cella | |
| 2020/0098064 A1 | 3/2020 | Cella | |
| 2020/0098066 A1 | 3/2020 | Cella | |
| 2020/0098067 A1 | 3/2020 | Cella | |
| 2020/0098068 A1 | 3/2020 | Cella | |
| 2020/0098069 A1 | 3/2020 | Cella | |
| 2020/0098070 A1 | 3/2020 | Cella | |
| 2020/0104156 A1 | 4/2020 | Cella | |
| 2020/0104157 A1 | 4/2020 | Cella | |
| 2020/0104158 A1 | 4/2020 | Cella | |
| 2020/0104178 A1 | 4/2020 | Cella | |
| 2020/0104867 A1 | 4/2020 | Cella | |
| 2020/0104871 A1 | 4/2020 | Cella | |
| 2020/0104872 A1 | 4/2020 | Cella | |
| 2020/0104873 A1 | 4/2020 | Cella | |
| 2020/0104932 A1 | 4/2020 | Cella | |
| 2020/0104949 A1 | 4/2020 | Cella | |
| 2020/0104955 A1 | 4/2020 | Cella | |
| 2020/0104956 A1 | 4/2020 | Cella | |
| 2020/0111065 A1 | 4/2020 | Cella | |
| 2020/0111178 A1 | 4/2020 | Cella | |
| 2020/0111179 A1 | 4/2020 | Cella | |
| 2020/0111180 A1 | 4/2020 | Cella | |
| 2020/0111181 A1 | 4/2020 | Cella | |
| 2020/0111182 A1 | 4/2020 | Cella | |
| 2020/0118224 A1 | 4/2020 | Cella | |
| 2020/0159876 A1* | 5/2020 | Hsu | G06Q 50/04 |
| 2020/0249950 A1 | 8/2020 | Cella | |
| 2020/0249951 A1 | 8/2020 | Cella | |
| 2020/0249952 A1 | 8/2020 | Cella | |
| 2020/0249953 A1 | 8/2020 | Cella | |
| 2020/0265329 A1* | 8/2020 | Thomsen | G06N 20/10 |
| 2020/0272469 A1 | 8/2020 | Cella | |
| 2020/0272470 A1 | 8/2020 | Cella | |
| 2020/0272471 A1 | 8/2020 | Cella | |
| 2020/0272472 A1 | 8/2020 | Cella | |
| 2020/0272473 A1 | 8/2020 | Cella | |
| 2020/0293321 A1 | 9/2020 | Cella | |
| 2020/0293322 A1 | 9/2020 | Cella | |
| 2020/0293323 A1 | 9/2020 | Cella | |
| 2020/0293324 A1 | 9/2020 | Cella | |
| 2020/0293325 A1 | 9/2020 | Cella | |
| 2020/0293326 A1 | 9/2020 | Cella | |
| 2020/0293327 A1 | 9/2020 | Cella | |
| 2020/0295936 A1* | 9/2020 | Covaci | G06F 16/27 |
| 2020/0379769 A1 | 12/2020 | Cella | |
| 2020/0379770 A1 | 12/2020 | Cella | |
| 2020/0379771 A1 | 12/2020 | Cella | |
| 2020/0387379 A1 | 12/2020 | Cella | |
| 2021/0090036 A1 | 3/2021 | Cella | |
| 2021/0109837 A1* | 4/2021 | Rakshit | G06F 11/3476 |
| 2021/0174316 A1 | 6/2021 | Cella | |
| 2022/0004925 A1 | 1/2022 | Cella | |
| 2022/0004926 A1 | 1/2022 | Cella | |
| 2022/0004927 A1 | 1/2022 | Cella | |
| 2022/0083707 A1* | 3/2022 | Santhar | G06F 30/20 |
| 2022/0156667 A1* | 5/2022 | Bellenguez | G06Q 10/06375 |
| 2022/0366494 A1* | 11/2022 | Cella | H04L 9/50 |
| 2022/0374950 A1 | 11/2022 | Matsuura | |
| 2022/0382271 A1 | 12/2022 | Hirohata | |
| 2023/0055641 A1* | 2/2023 | Prasath | G06F 9/451 |
| 2023/0058169 A1* | 2/2023 | Cella | G06N 3/08 |
| 2023/0088936 A1* | 3/2023 | Chalkley | H04L 9/3213 705/26.81 |
| 2023/0128173 A1* | 4/2023 | Sha | G06F 11/3628 703/21 |
| 2023/0297744 A1* | 9/2023 | Khandelwal | G06F 30/367 703/18 |
| 2023/0351218 A1 | 11/2023 | Uehara et al. | |
| 2023/0368882 A1* | 11/2023 | Krishnaswamy | A61B 5/6801 |
| 2023/0385445 A1* | 11/2023 | Saavedra | G16H 40/67 |
| 2023/0401643 A1* | 12/2023 | Chakrabarti | G10L 15/22 |
| 2024/0242008 A1* | 7/2024 | Mene | G06F 30/27 |

FOREIGN PATENT DOCUMENTS

| | | | | |
|---|---|---|---|---|
| JP | 2021502018 A | 1/2021 | | |
| JP | 2021523504 A | 9/2021 | | |
| JP | 2022074276 A | 5/2022 | | |
| JP | 2022180873 A | 12/2022 | | |
| JP | 2023163390 A | 11/2023 | | |
| WO | 2021075091 A1 | 4/2021 | | |
| WO | W0 2022/096099 | * | 5/2022 | G06Q 40/08 |

OTHER PUBLICATIONS

Diamantopoulos, Georgios et al., "Digital Twins for Dynamic Management of Blockchain Systems", Proceedings of the 2022 Winter Simulation Conference, pp. 2876-2887. (Year: 2022).*

Nielsen, Petersson, Christian et al, "Digital Twins and Blockchain-Proof of Concept", 53rd CIRP Conference on Manufacturing Systems, 2020, pp. 251-255. (Year: 2020).*

Suhail, Saba et al, "Blockchain-based Digital Twins: Research Trends, Issues, and Future Challenges", Association for Computing Machinery, Mar. 2021, pp. 1-30. (Year: 2021).*

R. Minerva, G. M. Lee and N. Crespi, "Digital Twin in the IoT Context: A Survey on Technical Features, Scenarios, and Architectural Models," in Proceedings of the IEEE, vol. 108, No. 10, pp. 1785-1824, Oct. 2020. (Year: 2020).*

M. Krishnamenon, R. Tuladhar, M. R. Azghadi, J. G. Loughran and G. Pandey, "Digital Twins and their significance in Engineering Asset Management," 2021 International Conference on Maintenance and Intelligent Asset Management (ICMIAM), Ballarat, Australia, 2021, pp. 1-6. (Year: 2021).*

X. Cao et al, "BDTwins: Blockchain-based Digital Twins Lifecycle Management," 2022 IEEE Smartworld, Ubiquitous Intelligence & Computing, Scalable Computing & Communications, Digital Twin, Privacy Computing, Metaverse, Autonomous & Trusted Vehicles, pp. 2003-2010. (Year: 2022).*

Office Action issued on Apr. 15, 2025, in corresponding Japanese Application No. 2023-038918, 10 pages.

* cited by examiner

FIG.1A

➤ BUILDING OWNER

➤ BIM HOLDING COMPANY

➤ ELEVATOR COMPANY

➤ MLIT AND MUNICIPALITY

➤ INFRASTRUCTURE INSURANCE COMPANY

| SENSING AND MONITORING |
| FAILURE RISK PREDICTION AND TRIAGE |
| MAINTENANCE PLANNING |

FIG.1B

➤ RAILROAD COMPANY

➤ DEVICE VENDOR

➤ RAILROAD SYSTEM COMPANY

➤ MAINTENANCE COMPANY

➤ INFRASTRUCTURE INSURANCE COMPANY

| SENSING AND MONITORING DATA |
|  |
| SURROGATE MODEL LIFE PREDICTION |
|  |
| FAILURE RISK PREDICTION (MAINTENANCE TIMING PRESENTATION) |

FIG.5

MODEL UTILIZATION SYSTEM (DISTRIBUTED COLLECTIVE TYPE)

1

P2P NETWORK

2

CONVENTIONAL SYSTEM (CENTRALIZED TYPE)

FIG.6

| | PUBLIC TYPE | PERMISSION TYPE | |
| --- | --- | --- | --- |
| | | CONSORTIUM TYPE | PRIVATE TYPE |
| ADMINISTRATOR | NO | YES (MULTIPLE COMPANIES) | YES (SINGLE COMPANY) |
| NODE PARTICIPANT | UNSPECIFIED INDIVIDUAL | PERMISSION BASE | |
| TRANSACTION PARTICIPANT | NOT LIMITED | PERMISSION BASE | |
| CONSENSUS BUILDING | STRICT AND HIGH-LEVEL | CONSENSUS AMONG PARTICIPANTS | CONSENSUS WITHIN ORGANIZATION |
| USE CASE | BITCOIN | THERE ARE MANY CASES OF UTILIZATION IN FINANCIAL INSTITUTIONS | |

FIG.7

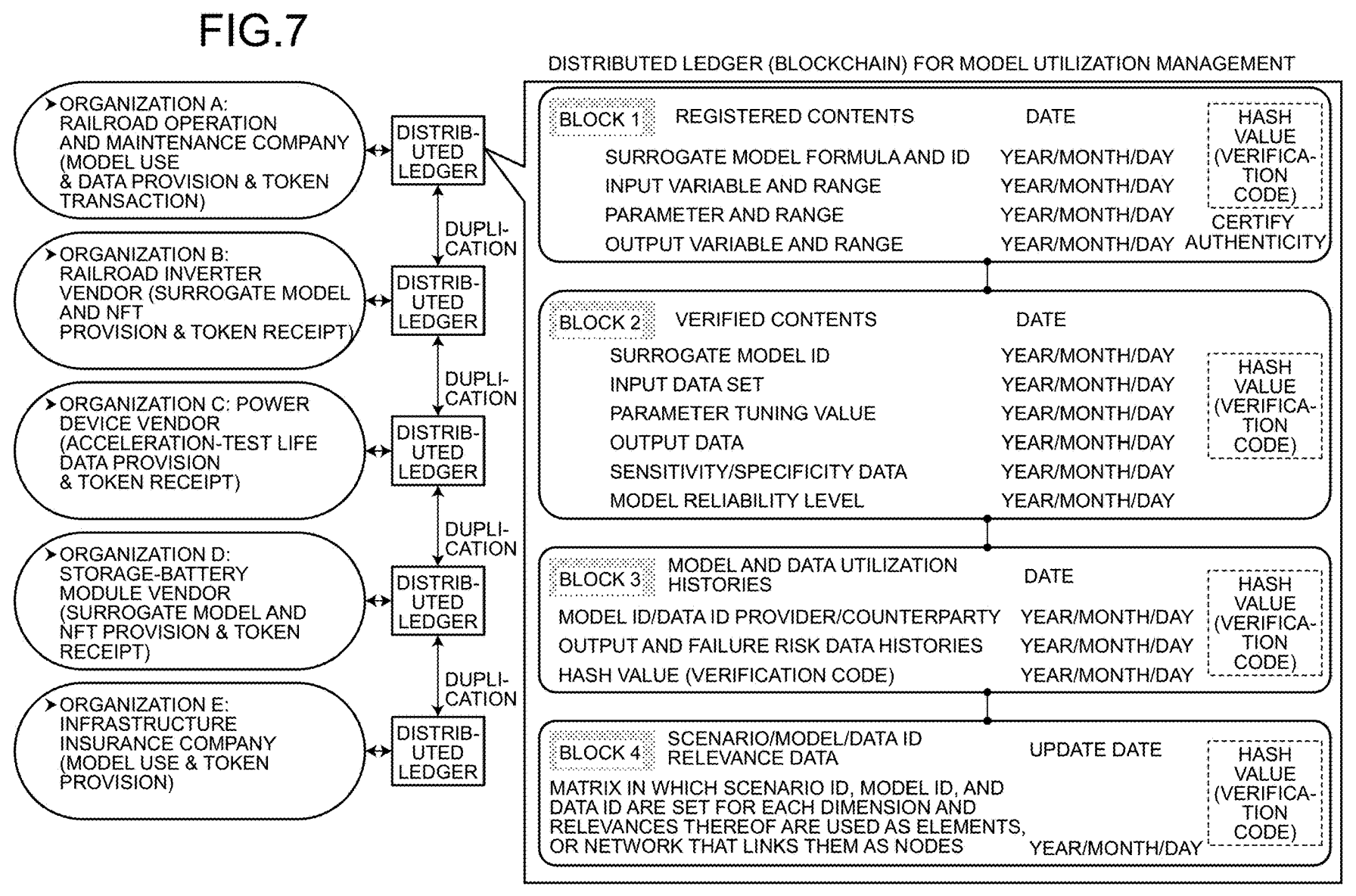

DISTRIBUTED LEDGER (BLOCKCHAIN) FOR MODEL UTILIZATION MANAGEMENT

BLOCK 1

| REGISTERED CONTENTS | DATE |
|---|---|
| SURROGATE MODEL FORMULA AND ID | YEAR/MONTH/DAY |
| INPUT VARIABLE AND RANGE | YEAR/MONTH/DAY |
| PARAMETER AND RANGE | YEAR/MONTH/DAY |
| OUTPUT VARIABLE AND RANGE | YEAR/MONTH/DAY |

HASH VALUE (VERIFICATION CODE)

CERTIFY AUTHENTICITY

BLOCK 2

| VERIFIED CONTENTS | DATE |
|---|---|
| SURROGATE MODEL ID | YEAR/MONTH/DAY |
| INPUT DATA SET | YEAR/MONTH/DAY |
| PARAMETER TUNING VALUE | YEAR/MONTH/DAY |
| OUTPUT DATA | YEAR/MONTH/DAY |
| SENSITIVITY/SPECIFICITY DATA | YEAR/MONTH/DAY |
| MODEL RELIABILITY LEVEL | YEAR/MONTH/DAY |

HASH VALUE (VERIFICATION CODE)

BLOCK 3

| MODEL AND DATA UTILIZATION HISTORIES | DATE |
|---|---|
| MODEL ID/DATA ID PROVIDER/COUNTERPARTY | YEAR/MONTH/DAY |
| OUTPUT AND FAILURE RISK DATA HISTORIES | YEAR/MONTH/DAY |
| HASH VALUE (VERIFICATION CODE) | YEAR/MONTH/DAY |

HASH VALUE (VERIFICATION CODE)

BLOCK 4

| SCENARIO/MODEL/DATA ID RELEVANCE DATA | UPDATE DATE |
|---|---|
| MATRIX IN WHICH SCENARIO ID, MODEL ID, AND DATA ID ARE SET FOR EACH DIMENSION AND RELEVANCES THEREOF ARE USED AS ELEMENTS, OR NETWORK THAT LINKS THEM AS NODES | YEAR/MONTH/DAY |

HASH VALUE (VERIFICATION CODE)

DISTRIBUTED LEDGER — DUPLICATION — DISTRIBUTED LEDGER — DUPLICATION — DISTRIBUTED LEDGER — DUPLICATION — DISTRIBUTED LEDGER — DUPLICATION — DISTRIBUTED LEDGER

ORGANIZATION A: RAILROAD OPERATION AND MAINTENANCE COMPANY (MODEL USE & DATA PROVISION & TOKEN TRANSACTION)

ORGANIZATION B: RAILROAD INVERTER VENDOR (SURROGATE MODEL AND NFT PROVISION & TOKEN RECEIPT)

ORGANIZATION C: POWER DEVICE VENDOR (ACCELERATION-TEST LIFE DATA PROVISION & TOKEN RECEIPT)

ORGANIZATION D: STORAGE-BATTERY MODULE VENDOR (SURROGATE MODEL AND NFT PROVISION & TOKEN RECEIPT)

ORGANIZATION E: INFRASTRUCTURE INSURANCE COMPANY (MODEL USE & TOKEN PROVISION)

FIG.10

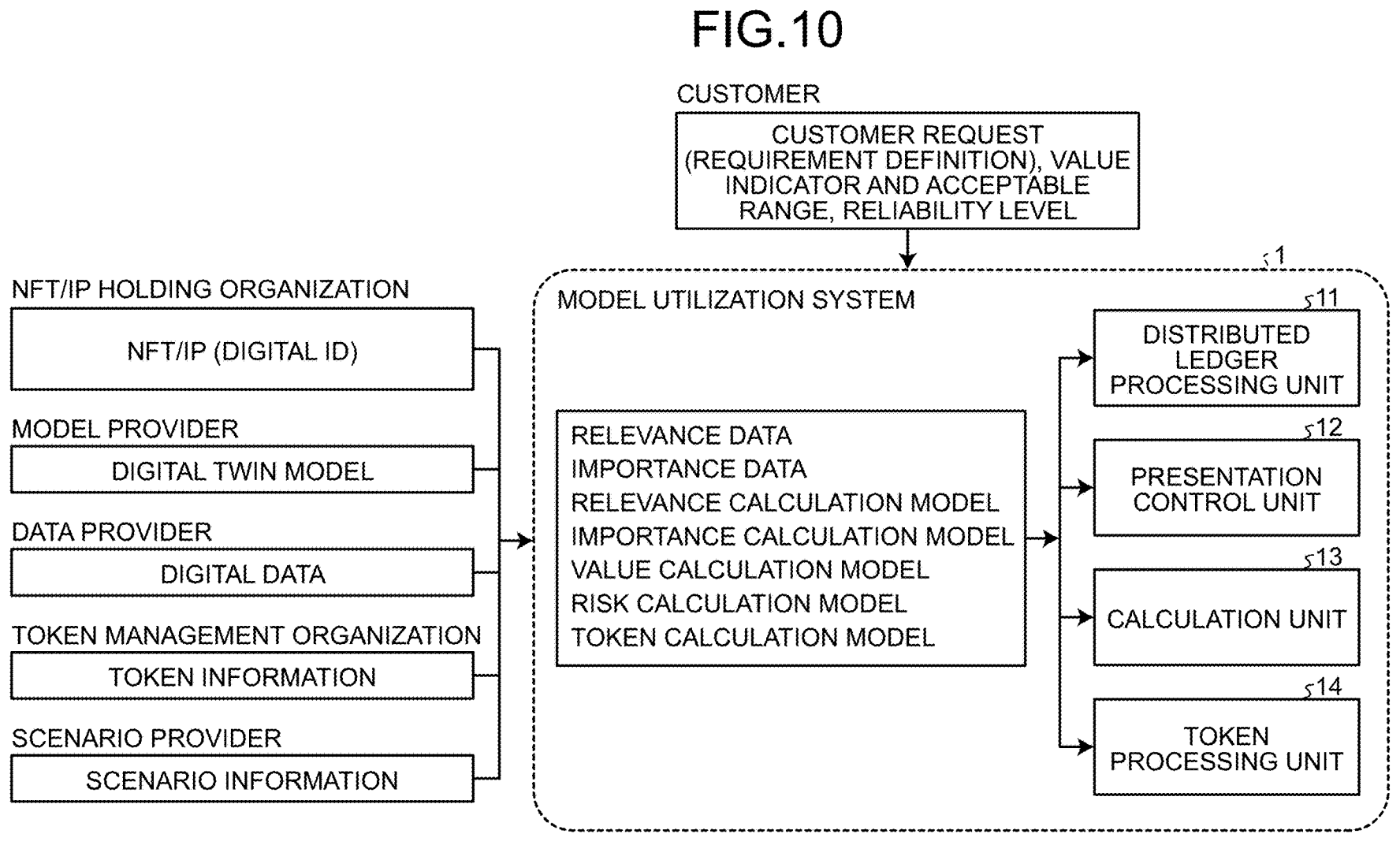

CUSTOMER

CUSTOMER REQUEST
(REQUIREMENT DEFINITION), VALUE
INDICATOR AND ACCEPTABLE
RANGE, RELIABILITY LEVEL

MODEL UTILIZATION SYSTEM

1

11
DISTRIBUTED
LEDGER
PROCESSING UNIT

12
PRESENTATION
CONTROL UNIT

13
CALCULATION UNIT

14
TOKEN
PROCESSING UNIT

RELEVANCE DATA
IMPORTANCE DATA
RELEVANCE CALCULATION MODEL
IMPORTANCE CALCULATION MODEL
VALUE CALCULATION MODEL
RISK CALCULATION MODEL
TOKEN CALCULATION MODEL

NFT/IP HOLDING ORGANIZATION

NFT/IP (DIGITAL ID)

MODEL PROVIDER

DIGITAL TWIN MODEL

DATA PROVIDER

DIGITAL DATA

TOKEN MANAGEMENT ORGANIZATION

TOKEN INFORMATION

SCENARIO PROVIDER

SCENARIO INFORMATION

MODEL UTILIZATION SYSTEM, MODEL UTILIZATION METHOD, AND COMPUTER PROGRAM PRODUCT

CROSS-REFERENCE TO RELATED APPLICATIONS

This application is based upon and claims the benefit of priority from Japanese Patent Application No. 2023-038918, filed on Mar. 13, 2023; the entire contents of which are incorporated herein by reference.

FIELD

Embodiments described herein relate generally to a model utilization system, a model utilization method, and a computer program product.

BACKGROUND

In a process of reducing downtime and improving availability of urban infrastructure systems, for example, utilization of digital twins is progressing. Distributed ledger/blockchain systems and digital money/token economy systems are also emerging as mechanisms for preventing data tampering and streamlining procedures such as contracts and negotiations.

However, with conventional techniques, it is difficult to more efficiently utilize a digital twin model while guaranteeing credit enhancement.

BRIEF DESCRIPTION OF THE DRAWINGS

FIG. 1A is a diagram illustrating an example 1 of a system for which a digital twin model is to be utilized;

FIG. 1B is a diagram illustrating an example 2 of the system for which the digital twin model is to be utilized;

FIG. 5 is a diagram illustrating an example of a network structure of the distributed ledger (blockchain) in the embodiment;

FIG. 6 is a diagram illustrating an example of a form of the distributed ledger (blockchain) in the embodiment;

FIG. 7 is a diagram illustrating an example 1 of the distributed ledger (blockchain) in the embodiment;

FIG. 10 is a diagram for describing an example of a method of extracting candidates of scenarios, models, and data in the embodiment;

DETAILED DESCRIPTION

Figure 2:
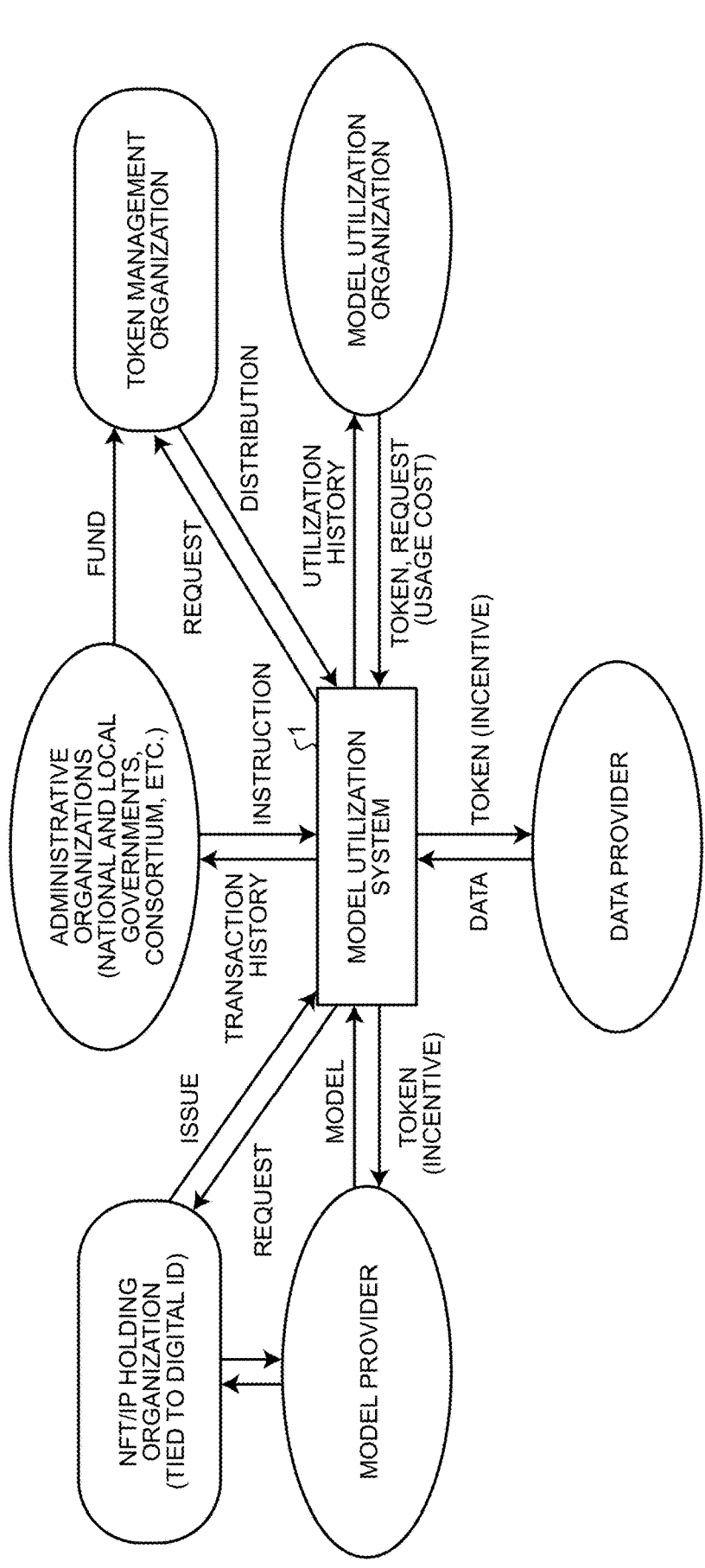
FIG. 2 is a diagram for describing a mechanism of a model utilization system according to an embodiment.

In general, according to one embodiment, a model utilization system includes a memory and one or more processors coupled to the memory. The one or more processors are configured to: perform processing of a distributed ledger configured to store a scenario to be used for analysis of a target system, a digital twin model to be used for the analysis, and data to be input to the digital twin model; calculate a token that indicates an incentive for an organization that has provided the digital twin model to be utilized and for an organization that has provided the data to be utilized; and retrieve, from the distributed ledger, a candidate of the scenario that satisfies a user request, a candidate of the digital twin model that satisfies the user request, and a candidate of the data that satisfies the user request, present the candidate of the scenario retrieved, the candidate of the digital twin model retrieved, and the candidate of the data retrieved, and present a token required to use a combination of the candidate of the digital twin model retrieved and the candidate of the data retrieved.

Exemplary embodiments of a model utilization system, a model utilization method, and a computer program product will be described below in detail with reference to the accompanying drawings. The present invention is not limited to the following embodiments.

In the case of an infrastructure system involving a plurality of organizations, such as public institutions, infrastructure operating companies, infrastructure developing companies, and infrastructure insurance companies, it is a challenge to develop mechanisms for utilization of digital models and data credit enhancement related to digital twins. For example, while digital twins for urban cities are expected, it is a challenge to develop a method and a mechanism for credit enhancement in the utilization of digital models and sensitive data by utilizers and a plurality of organizations including a plurality of companies, public institutions, and national and local governments. Examples of the credit enhancement include the followings.

Authenticity: Prevent connection of fake users and devices (sensors)

Integrity: Prevent data and digital models from tampering

Reliability: Reliability of data, reliability of data accuracy against sensor equipment failure or improper sensing method, and reliability of communication and control (including Verification & Validation (V&V) level of simulation).

Confidentiality: Protect personal information, and limit the utilization or disclosure of information on the basis of user authority (including user authentication and protection of intellectual property (IP) of digital models).

Availability: Robustness against system failures such as partial communication interruptions and flexibility to reconfigure and rebuild a system (including improvement of scalability) through a distributed mechanism in the operation and maintenance of a digital twin.

Examples of the infrastructure system include infrastructure structures, plants, power electronics, storage battery systems, elevator systems, distributed energy, power grids, water grids, transportation networks, and communication networks.

FIG. 1A is a diagram illustrating an example 1 of a system for which a digital twin model is to be utilized. The example in FIG. 1A illustrates a case of scenario planning in the maintenance of infrastructure equipment such as elevators.

Maintenance planning is determined through sensing and monitoring of infrastructure equipment, and failure risk prediction and triage of infrastructure equipment. For example, in the case of an elevator as the infrastructure equipment, the maintenance planning includes determining the sequence of restoration support work by field engineers when a plurality of failures have occurred.

In the case of an infrastructure equipment system such as an elevator, for example, a building owner, a building information modeling (BIM) holding company, an elevator company, the Ministry of Land, Infrastructure, Transport and Tourism (MLIT), a municipality, and an infrastructure insurance company are involved.

FIG. 1B is a diagram illustrating an example 2 of the system for which the digital twin model is to be utilized. The example in FIG. 1B illustrates a case of predictive maintenance (failure risk prediction) of power electronics equipment in railroad vehicles.

The failure risk prediction (presentation of maintenance timings) is performed based on life predictions obtained by inputting sensing and monitoring data into a surrogate model.

In the case of predictive maintenance of power electronics equipment for railroad vehicles, for example, a railroad company, a device vendor, a railroad system company, a maintenance company, and an infrastructure insurance company are involved.

FIG. 2 is a diagram for describing a mechanism of a model utilization system according to an embodiment. The following three mechanisms are mainly needed to facilitate the utilization of the digital twin model.

(1) A method and a mechanism for credit enhancement (reliability, confidentiality, and availability) in the utilization of the digital twin model and data by a plurality of organizations such as a plurality of companies, public institutions, and national and local governments.

(2) A mechanism to provide incentives to data and model providers (3) A mechanism to build a consensus among a plurality of organizations to achieve compatibility among various values (resilience improvement for safety and security, carbon neutrality, circular economy, energy management, and economic efficiency, etc.) in customer requests (an example of user requests), by calculating each value, risk, and acceptable range, and then extracting candidates of scenarios and candidates of models that can achieve the compatibility while guaranteeing credit enhancement.

A model utilization system 1 according to the embodiment has a function of extracting and presenting candidates of scenarios, models, and data (data sets) to be utilized. The model utilization system 1 according to the embodiment also has a function of calculating and presenting model risks, model values, and tokens (digital currency) related to model utilization.

The model utilization system 1 according to the embodiment extracts candidates of scenarios, models, and data by utilizing not only importance and relevance obtained from the utilization history of models and data, but also a token calculation model, a value calculation model, and a risk calculation model. For scenarios, models, and data that have been utilized, not only utilization history data and reliability data, but also matrix data (or network data, etc.) indicating the relevance and importance of each scenario, model, and data are registered (updated) in a distributed ledger.

Example of Functional Configuration

Figure 3:
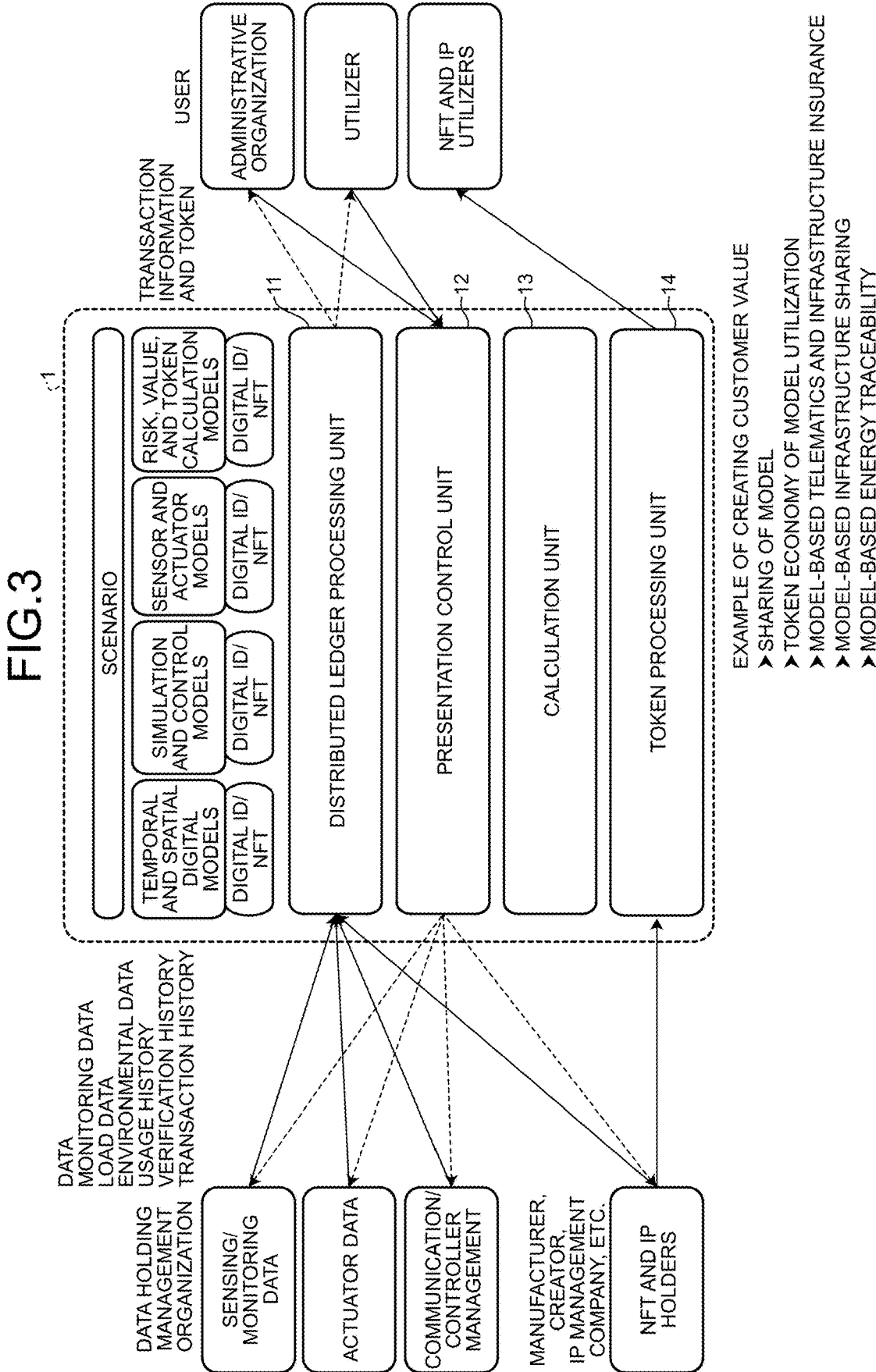
FIG. 3 is a diagram illustrating an example of the functional configuration for model utilization processing of the model utilization system according to the embodiment.

FIG. 3 is a diagram illustrating an example of a functional configuration for model utilization processing of the model utilization system 1 according to the embodiment. The example of the model utilization system 1 in FIG. 3 illustrates a case of a digital twin model utilization system to which distributed ledger technology is applied.

The model utilization system 1 according to the embodiment includes a distributed ledger processing unit 11, a presentation control unit 12, a calculation unit 13, and a token processing unit 14.

The distributed ledger processing unit 11 performs processing of a distributed ledger (e.g., processing of blockchain transactions) related to the utilization of the model. For example, the distributed ledger processing unit 11 includes at least one of processes of: authentication of users accessing the distributed ledger; access control of the distributed ledger based on user authority; consensus building; transaction execution; fee determination; registration of blocks in the distributed ledger; and mining of the distributed ledger.

The presentation control unit 12 extracts candidates of scenarios, models, and data to be utilized and presents presentation information including scenarios, models, and data that have been extracted. For example, the presentation control unit 12 retrieves a candidate of a digital twin model in which risks and values calculated by the calculation unit 13 satisfy user requests (e.g., customer requests).

Here, the scenarios mean scenarios for assuming events that may occur in the future. For example, in the case of predictive maintenance, the scenarios include operation and maintenance scenarios for infrastructure systems and hazard scenarios such as earthquakes and strong winds, which are consistent with customer requests.

The presentation control unit 12 extracts important scenario candidates or relevant scenario candidates from a plurality of assumed scenarios on the basis of customer requests, and presents the extracted scenario candidates. Furthermore, the presentation control unit 12 finds models and data sets that are relevant to the assumed scenarios on the basis of relevance information from among the scenarios, models, and data registered in the distributed ledger (blockchain), and presents the models and data sets as well.

The relevance information is, for example, a matrix in which scenario ID, model ID, and data ID are set for each dimension and the relevances thereof are used as elements. For example, the relevance information is a network in which each scenario ID, each model ID, and each data ID are set as nodes, and links between relevant nodes (each link is accompanied by a value related to the relevance therebetween) exist. For example, the relevance information is a statistical and probabilistic model for the scenario ID, the model ID, and the data ID. For example, the relevance information is an Artificial Intelligence (AI)/machine learning model for the scenario ID, the model ID, and the data ID.

The models presented by the presentation control unit 12 may be models automatically generated from a function candidate library.

The calculation unit 13 calculates risks and values of the models. Based on each scenario candidate, the calculation unit 13 calculates a risk calculated from each model candidate and a value indicating the usefulness of the model candidate. For example, in order to achieve compatibility among various values in customer requests (e.g., improving resilience of infrastructure systems for safety and security, carbon neutrality, circular economy, and energy management), the calculation unit 13 calculates the respective values, risks, and acceptable ranges. The calculation unit 13 enables the above-described presentation control unit 12 to extract and present candidates of scenarios and models that also guarantee credit enhancement.

The token processing unit 14 processes a Non-Fungible Token (NFT) for model utilization and a token for IP. Here, the NFT is the digitized data of a non-fungible token tied to the model ID or the data ID.

The model utilization system 1 according to the embodiment includes various model bases related to the digital twin and databases.

The model bases related to the digital twin are, for example, temporal and spatial digital models, simulation models, control models, failure and life prediction models, sensor and actuator models, and risk, value, and token calculation models. Each of these has a digital ID or NFT tied to the distributed ledger. The main bodies of the digital models may also be stored on a model base of a blockchain system, or only the digital ID and the NFT may be stored on the blockchain system and the main bodies of the digital models stored on other systems may be referred to and read.

Figure 4:
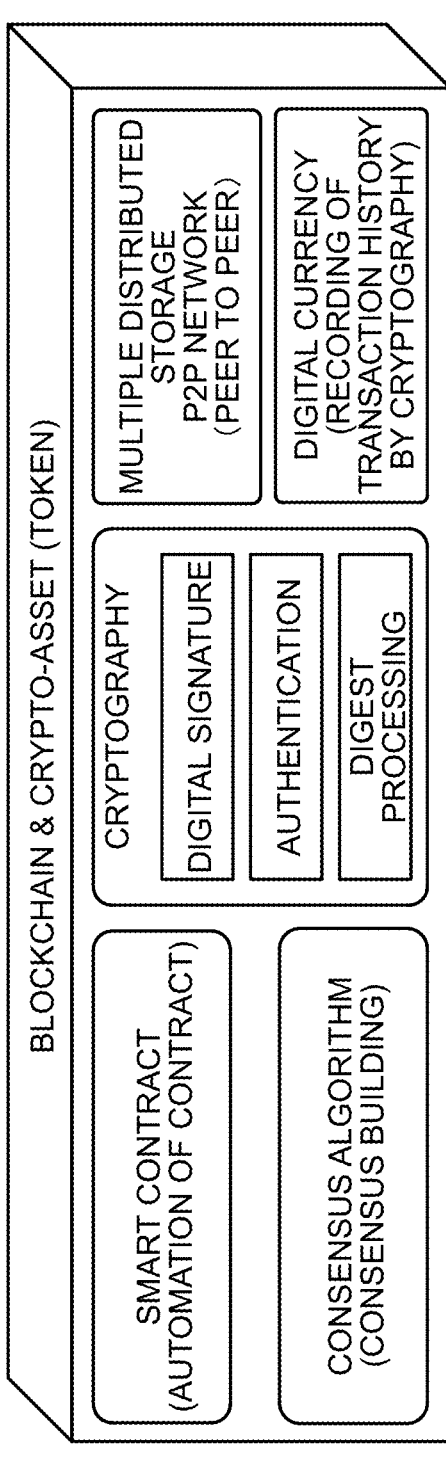
FIG. 4 is a diagram illustrating a functional example of a distributed ledger (blockchain) in the embodiment.

FIG. 4 is a diagram illustrating a functional example of the distributed ledger (blockchain) in the embodiment. The blockchain in the embodiment guarantees the trust and accuracy of a counterparty with whom a transaction is to be conducted and protects privacy by incorporating therein a "digital signature" mechanism using public-key encryption (public key/private key) cryptography. When sending and receiving a secret message using public-key cryptography, a sender obtains a public key published by a receiver to encrypt the message. The encrypted message can only be decrypted with a private key that the receiver has, and thus the contents of the message cannot be deciphered or altered even if intercepted by a third party along the way.

In the case of the distributed ledger such as the blockchain in the embodiment, there is no central administrator, and thus all participants must monitor unauthorized transactions and all participants must agree on the validity of new transactions made in the network. However, as a matter of course, consensus building in a distributed network is more difficult than in a centralized network. Thus, in the distributed network, a certain "consensus algorithm (program)", or a rule for a consensus building, is established to smoothly build consensus among participants and record new transactions while eliminating transaction irregularities.

A smart contract (automation of contracts) is a mechanism to program the conditions for contract performance (stipulations) in transactions of the blockchain in the embodiment, and to automatically establish and fulfill contracts. The smart contract is a computer program that runs on the blockchain and, in the context of insurance, establishes a contract when the requirements for establishment of the contract are satisfied and makes insurance payments when the requirements for payment of insurance claims are satisfied. The smart contract executes these procedures by digital processing on behalf of parties concerned. This mechanism is similar to the mechanism of a vending machine, in which a sales contract is established at the moment when a user inserts coins and selects a drink button, and thus can save labor in complex procedures such as negotiation, execution, and verification related to the contract.

Figure 5:
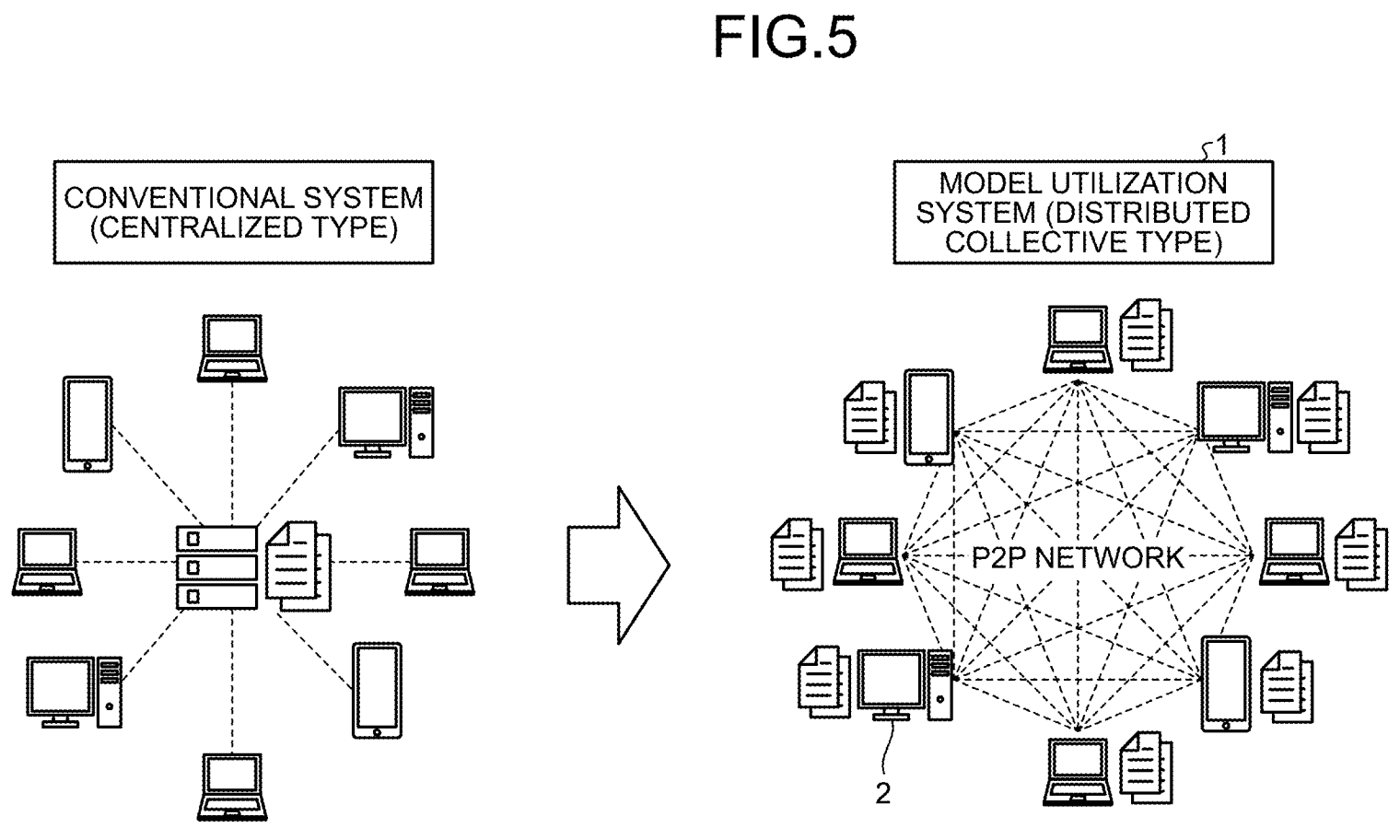

FIG. 5 is a diagram illustrating an example of a network structure of the distributed ledger (blockchain) in the embodiment. The role of distributed ledger management of the blockchain in the embodiment is played by a peer to peer (P2P) network. Unlike the conventional client-server type, it enables information sharing and transaction payment between participating users (nodes 2) through direct one-to-N communication between the nodes 2 without a specific server or client. The P2P network has played a pivotal role in moving away from centralized integrated transactions to open, fair, and equitable direct trading among participants.

In the embodiment, each node 2 is managed and used by participants who use the model utilization system 1, such as data holding management organizations, manufacturers, creators, and IP management companies.

FIG. 6 is a diagram illustrating an example of a form of the distributed ledger (blockchain) in the embodiment. The form of the distributed ledger in the embodiment is a consortium type. The administrators of the distributed ledger in the embodiment are, for example, a plurality of companies. The administrators may include non-profit organizations and administrative agencies other than companies. The node participants and transaction participants of the distributed ledger in the embodiment are on a license basis. Consensus building of the distributed ledger in the embodiment is consensus among the participants.

Note that such consortium-type distributed ledgers are used, for example, by financial institutions.

A target system of the model utilization system 1 in the embodiment is, for example, an infrastructure system. For example, data to be input to the model includes at least one of a usage history of the infrastructure system, a load history of the infrastructure system, and monitoring data of the infrastructure system. For example, the model to be utilized is a surrogate model to be used for at least one of diagnosis of abnormal signs of the infrastructure system, life prediction of the infrastructure system, and failure risk prediction of the infrastructure system.

FIG. 7 is a diagram illustrating an example 1 of the distributed ledger (blockchain) in the embodiment. With reference to the example in FIG. 7, a case in which the system to be analyzed is the infrastructure system will be described as an example. Specifically, the example in FIG. 7 illustrates the case of a distributed ledger for utilization and management of a simulation surrogate model for power electronics predictive maintenance.

Figure 8:
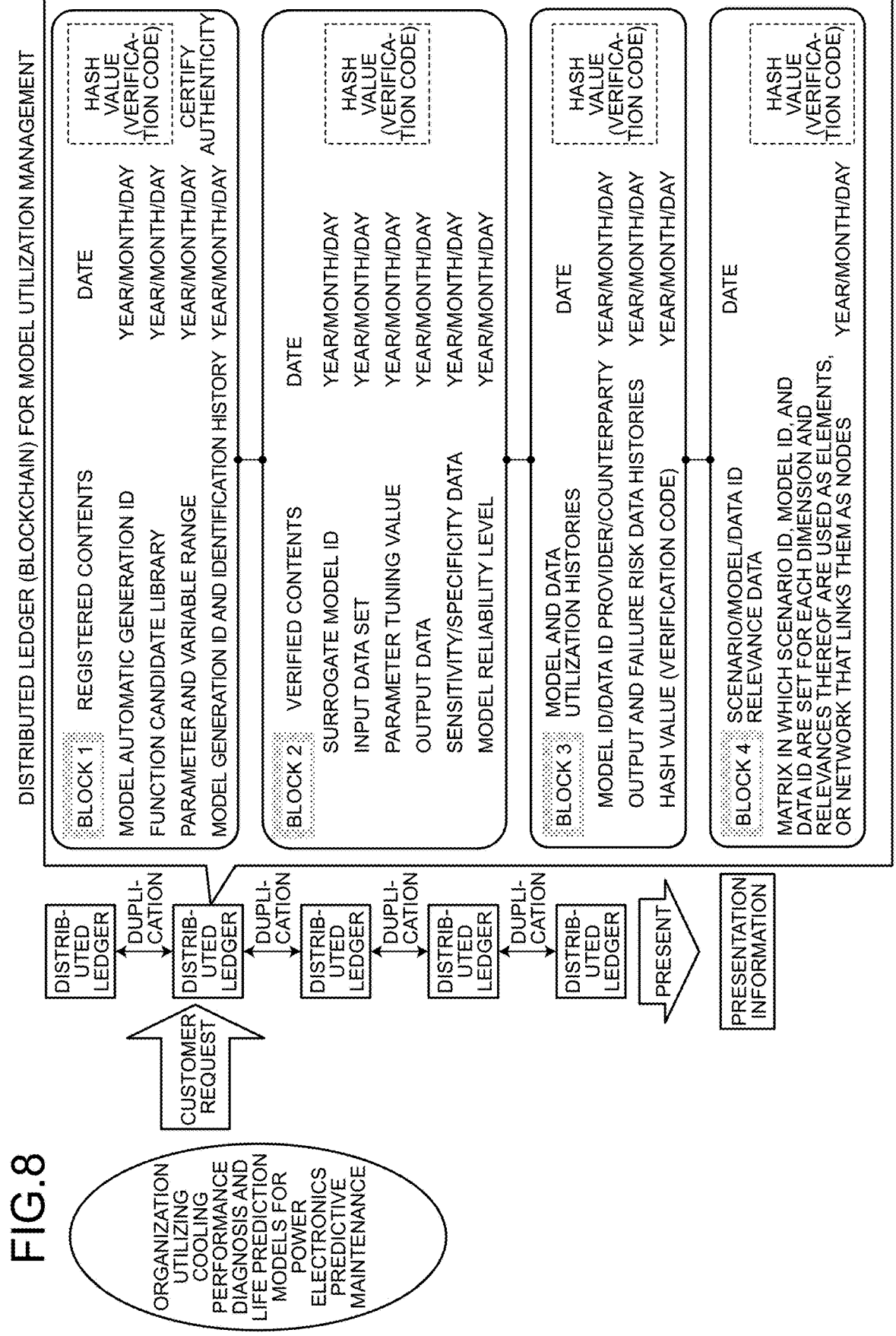
FIG. 8 is a diagram illustrating an example 2 of the distributed ledger (blockchain) in the embodiment.

FIG. 8 is a diagram illustrating an example 2 of the distributed ledger (blockchain) in the embodiment. The example in FIG. 8 illustrates a distributed ledger in the utilization and management of an automatically generated model.

For example, a customer request from a maintenance company is to determine maintenance timing for maintenance of an inverter ID-XX and a battery module ID-YY. For example, a customer request from an infrastructure insurance company is to calculate a failure risk for the calculation of insurance premiums for the inverter ID-XX and the battery module ID-YY.

For example, the presentation information includes a life-prediction model ID, a cooling-performance diagnostic model ID, an associated surrogate model ID, and input data ID for the inverter ID-XX and the battery module ID-YY. For example, the presentation information also includes failure risks, abnormal factor candidates, and tokens for input data such as an operating history and a load history of the inverter ID-XX and the battery module ID-YY.

As illustrated in FIG. 8, the surrogate model to be utilized may be a model generated from a function candidate library based on user requests.

The following describes an IP (license & model) distribution and management function of the digital twin model using the NFT.

Figure 9:
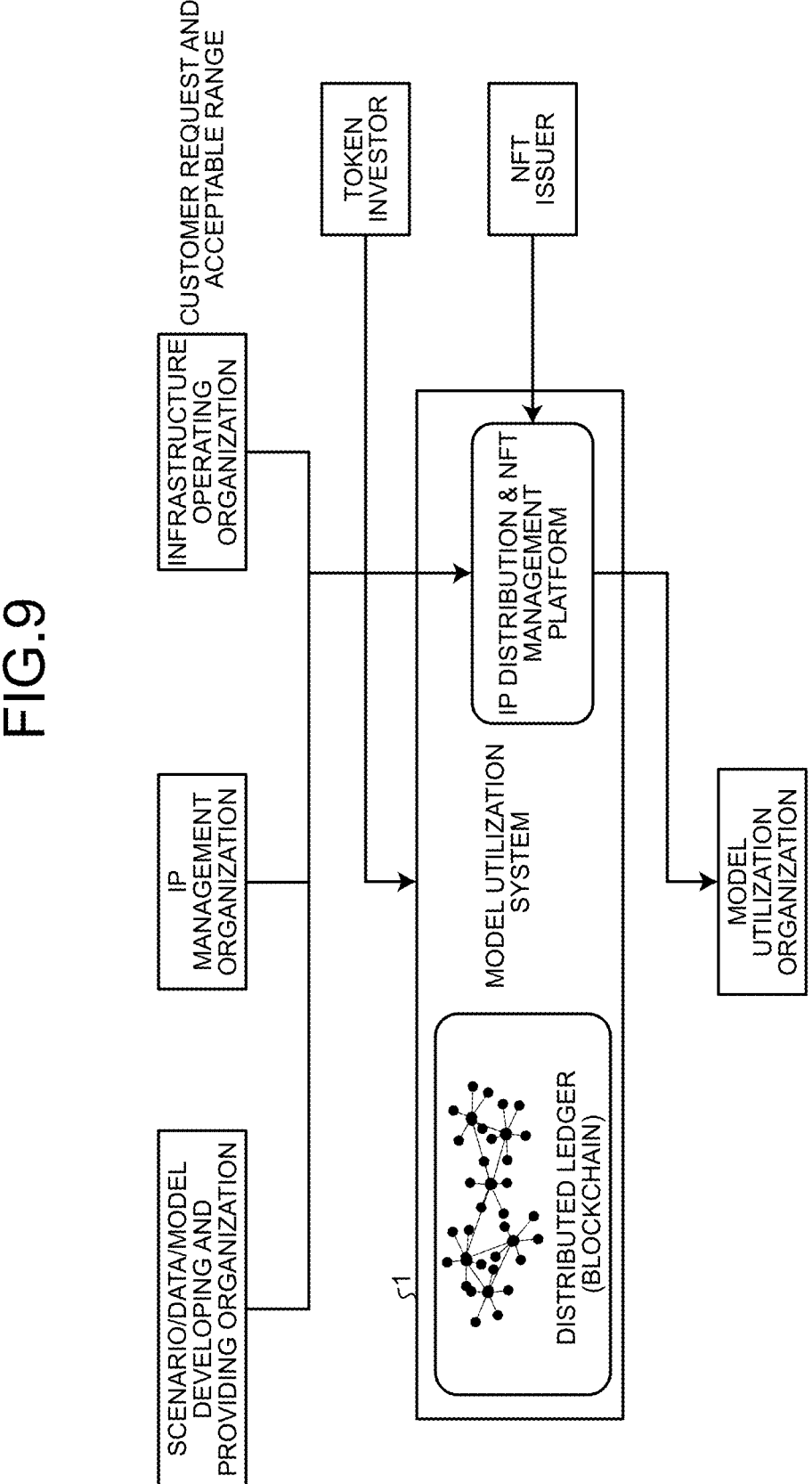
FIG. 9 is a diagram for describing a configuration for IP distribution and NFT management of the model utilization system according to the embodiment.

FIG. 9 is a diagram for describing a configuration for the IP distribution and the NFT management of the model utilization system 1 in the embodiment. Information stored in the distributed ledger (blockchain) of the model utilization system 1 in the embodiment includes:

Model Provider Information;

Tag information (tied to IDs);

Relevance information of scenario, model, and data IDs;

Model utilization history information and token information;

Model reliability, importance, risk, and value calculation information;

Transaction history information;

Owner Information; and

Others (e.g., information related to infrastructure failure risk calculation).

Tokens processed by the token processing unit 14 are traded on a platform for the IP distribution and the NFT management.

The following describes the details of a method of extracting candidates of scenarios, models, and data to be utilized. FIG. 10 is a diagram for describing an example of the method of extracting candidates of scenarios, models, and data in the embodiment.

Examples of the digital twin model include a simulation model, a surrogate model, a sensor model, BIM/CIM (Building/Construction Information Model), and a control model.

The value calculation model is a model for calculating value indicators of customer requests. Examples of the value calculation model include a carbon footprint calculation model, a predictive maintenance model, an energy consumption calculation model, a waste volume calculation model, and an economic-efficiency calculation model.

The predictive maintenance model includes a life prediction model and a failure probability prediction model.

The risk calculation model is a model for calculating the risk of failing to satisfy the acceptable ranges of customer requests and value indicators. For example, the risk calculation model is a failure risk prediction model for calculating the probability of failing to satisfy a required life and the cost of loss if the customer request is a failure risk prediction for calculating an infrastructure insurance cost or if it is the planning of a predictive maintenance policy.

The digital data provided by the data provider in FIG. 10 includes observation data, monitoring data, test and measurement data, sensing data, simulation data, material property data, and training data.

Figure 11:
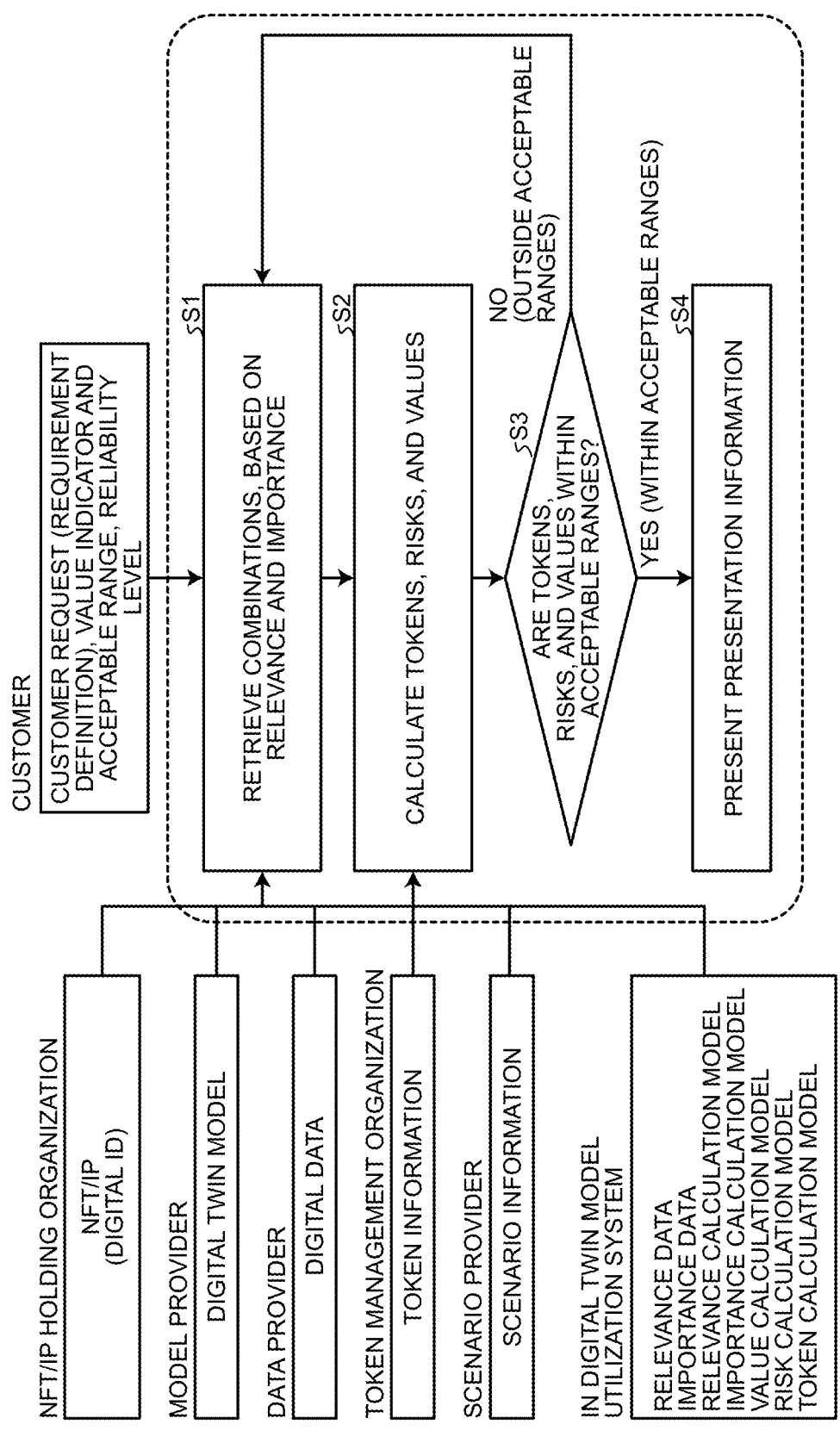
FIG. 11 is a flowchart illustrating an example of the method of extracting candidates of scenarios, models, and data in the embodiment.

The following describes the method of extracting candidates of scenarios, models, and data to be utilized. FIG. 11 is a flowchart illustrating an example of the method of extracting candidates of scenarios, models, and data in the embodiment.

To begin with, the presentation control unit 12 retrieves combinations of relevant models and data sets according to an assumed scenario on the basis of the relevance information described above and the importance obtained from the utilization history of models and data (step S1).

Here, the relevance information is calculated from, for example, matrix, network, and relevance models that express relevances of the matrix, the network, the statistical and probabilistic model, and the AI/machine learning model described above. The presentation control unit 12 may calculate the relevances and the importances from relevance and importance calculation models that include the importance of each scenario ID, model ID, and data ID in these relevance models.

As the scenarios, models, and data are utilized, the presentation control unit 12 learns the relevance of the scenarios, models, and data in the utilization and updates the relevance calculation model and importance calculation model. The presentation control unit 12 may also learn data related to the results of risk and value calculations, the utilization history, and evaluation results from utilizers.

Subsequently, the token processing unit 14 calculates tokens, and the calculation unit 13 calculates risks and values (step S2).

Subsequently, the presentation control unit 12 determines whether the tokens, the risks, and the values for the scenarios, models, and data of the presented candidates are within the acceptable ranges (step S3). Specifically, the presentation control unit 12 extracts candidates of scenarios, models, and data, by utilizing not only importances and relevances obtained from the utilization history of the models and data but also the token calculation model and the value and risk calculation models.

If the tokens, the risks, and the values for the scenarios, models, and data of the presented candidates are outside the acceptable ranges (No at step S3), the process returns to step S1.

If the tokens, the risks, and the values for the scenarios, models, and data of the presented candidates are within the acceptable ranges (Yes at step S3), the presentation control unit 12 presents presentation information (step S4). For example, the presentation information includes candidates of scenarios to be utilized and candidates of models and data (model IDs and the corresponding data IDs tied to each other) that satisfy customer requests. The presentation information may include candidates of models and data that are highly requested. The presentation information may also include candidates of data that contributes significantly to improvement of model reliability.

For the scenario IDs, model IDs, and data set IDs that have been utilized, the presentation control unit 12 may register (update) in the distributed ledger, not only the utilization history data and reliability data, but also data related to the matrix of relevance and importance for each model ID and data ID and also data related to the calculation models.

Here, the presentation control unit 12 may set an assumed scenario ID in advance among the scenario IDs, model IDs, and data IDs, and extract and present candidates of model IDs and data set IDs associated with the scenario ID.

The presentation control unit 12 also presents candidates of models and data that have not yet been registered in the distributed ledger but that contribute to risk reduction, for example, when the value satisfies customer requests but the risk does not fall within the acceptable range due to low model reliability, based on value and risk calculations. In this case, the presentation control unit 12 may also provide incentives to organizations that have provided the candidates models and data that contribute to risk reduction by offering tokens that can be provided.

The presentation control unit 12 may tentatively register the models and data that have not yet been registered in the distributed ledger, and the calculation unit 13 may perform simulations, such as tentatively performing value calculation and risk calculation. In other words, the presentation control unit 12 may include a tentative model/data registration function, and the calculation unit 13 may include a simulation function using the tentative models and data.

The following describes a risk/value calculation method.

When indicators form a probability distribution as in the calculation of indicators using a value model in the presence of uncertainty, the term "value" means a representative value of the indicators, such as the expected value or the mean value of the probability distribution. Based on, for example, whether prediction of physical quantities for changes in model variables can be performed or whether prediction about temporal changes in breakage probability can be performed, the value model may be a value model indicator that outputs 1 when the prediction can be performed and outputs 0 when it cannot be performed.

When indicators form a probability distribution, the term "risk" means the probability of occurrence of an event in the tails of the probability distribution, which falls outside the acceptable range, the probability of occurrence of an emergent and rare event, or the probability occurrence multiplied by its loss cost.

The calculation unit 13 may include a scenario simulation function for calculation of risks and values.

When calculating the risk of a model, for example, the calculation unit 13 calculates indicators expressed in a probability distribution on the basis of candidates of a scenario, by performing simulation using candidates of a model and candidates of data to be input into the model. The calculation unit 13 then calculates the risk on the basis of the probability of occurrence of an event in the probability distribution in which an indicator expressed in the probability distribution falls outside the acceptable range determined based on user requests, or on the basis of the product obtained by multiplying the loss cost by the probability of occurrence of an event in the probability distribution in which the indicator falls outside the acceptable range. For example, the calculation unit 13 also calculates model reliability by uncertainty evaluation based on indicators expressed in the probability distribution, and calculates the risk to be higher as the model reliability is lower.

In calculating the value of a model, for example, the calculation unit 13 calculates indicators expressed in a probability distribution on the basis of the candidates of the scenario, by performing simulation using the candidates of the model and the candidates of the data to be input into the model. The calculation unit 13 then calculates the value on the basis of at least one of the expected value and the average value of indicators expressed in the probability distribution. For example, the calculation unit 13 also calculates model reliability by uncertainty evaluation based on indicators expressed in the probability distribution, and calculates the value to be higher as the model reliability is higher. For example, the calculation unit 13 also calculates a first importance of a candidate of a model to be higher as the usage histories of the candidate of the model are more, calculates a second importance of a candidate of data input to the model to be higher as the usage histories of the candidate of the data input to the model are more, and calculates the value to be higher as the first and second importances are higher.

Specifically, inputs for the risk/value calculation method by the calculation unit 13 are scenario plans (e.g., infrastructure system configuration plans, system operation scenario plans, maintenance scenario plans, insurance scenario plans, and model and data selection plans). Outputs are the following (1) value calculation model, (2) risk calculation model, and (3) reliability calculation model.

For example, when model candidates are extracted by scenario simulation, the outputs are as follows.

(1) Value Calculation Model

Calculation of the expected value of a failure probability by life prediction simulation for infrastructure insurance cost calculation Calculation of the expected value of a resilience indicator by predictive maintenance simulation Calculation of the expected value of energy consumption by energy consumption prediction simulation for energy conservation Calculation of the expected value by carbon footprint calculation simulation for $CO_2$ emission reduction Calculation of the expected value by waste volume calculation simulation for circular economy (waste reduction)

Calculation of the expected value by economic efficiency (system construction, operation, maintenance, and insurance costs) simulation (2) Risk Calculation Model Calculation of the risk of failure probability exceeding the acceptable range for infrastructure insurance cost calculation Calculation of the risk of failure of the infrastructure system during the period of use Calculation of the risk of exceeding the acceptable range of energy consumption Calculation of the risk of exceeding the acceptable range of carbon footprint Calculation of the risk of exceeding the acceptable range of waste volume Calculation of the risk of exceeding the acceptable ranges of infrastructure system construction cost, operation cost, maintenance cost, and insurance cost (3) Reliability Calculation Model Calculation of the model reliability by uncertainty evaluation with simulation models and surrogate models Calculation of the model reliability by uncertainty evaluation of value and risk calculations Here, a case in which the digital twin model is a surrogate model will be described with reference to an example of using it for predictive maintenance of infrastructure. A scenario simulation method will be also described.

A case will be described in which, for example, candidates of scenarios, models, and data for studying solutions to maintenance triage and infrastructure insurance are extracted in order to reduce downtime and improve resilience in a group of urban elevators. When the degree of damage and failure risk of elevators by past earthquake histories and expected future earthquakes are predicted, the maximum acceleration, the maximum displacement, the duration of shaking, and the like of buildings and infrastructure structures in response to earthquakes are used as structural response indicators for predicting the degree of damage and failure risk of elevators.

To simulate these structural response indicators and predict the failure probability, companies and organizations operating and maintaining the system need a surrogate model for structural response simulation and failure probability prediction, in addition to urban terrain and ground models owned by an organization A, a building model owned by an organization B, an elevator structure owned by an organization C, acceleration monitoring data for the building and ground owned by an organization D, and image data for allowing measurement of the shaking of the building owned by an organization E, for example.

This surrogate model may be prepared and stored in advance, or the presentation control unit 12 may automatically generate or update the surrogate model on the basis of these data and models. The scenario simulation function in the calculation unit 13 generates a surrogate model that can simulate a structural response to an earthquake and the failure probability on the basis of the data and models held by a plurality of the organizations for scenarios such as a target city, an infrastructure structure plan, and load assumptions such as earthquake histories.

The calculation unit 13 then performs a Monte Carlo simulation of the structural response based on a surrogate model and, from the structural response distribution of the maximum acceleration, the maximum displacement, and the shaking duration, for example, calculates the failure probability on the basis of the surrogate model for predicting the probability of occurrence of each failure mode constructed from the past failure mode data and each failure occurrence data. Repair time and response cost differ for each failure mode, and thus solutions to maintenance triage and infrastructure insurance can be studied based on, for example, prediction data on changes in failure probability over time for each failure mode.

In the risk and value calculation by the calculation unit 13, risk calculation, value calculation, and model reliability calculation for customer requests, such as elevator failure probability, model reliability level, and calculation time, for a group of scenarios assumed by the customer, are performed by a virtual scenario simulation function.

The following describes a case in which the digital twin model is utilized for control models.

For example, in a case in which an observer is identified by a surrogate model for estimating structural response when a specific waveform that results in longevity, the process flow will be as follows. Consider the case in which the observer estimates the state of a control target and a feedback controller calculates control inputs.

A surrogate model for predicting structural response is used as a model for the control target used in the observer, and the state of the control target, which cannot be detected from the state detected from the control target, is estimated from the observer. The feedback controller calculates the control inputs using a specific waveform that will result in target longevity and the state of the control target estimated by the observer. In this manner, by using the surrogate model for predicting structural response and causing the waveform of the control target to follow a given waveform that will result in longevity, the longevity of the system can be enhanced.

Specifically, in the case of feedforward control, the model is a surrogate model used to calculate control inputs for the feedforward control of an infrastructure system. In this case, the calculation unit 13 uses the surrogate model in an observer for the feedforward control to perform simulation for predicting the state of the infrastructure system and determining the control inputs, and calculates the risk and value of the surrogate model on the basis of the simulation results.

In the case of feedback control, the model is a surrogate model used to calculate control inputs for the feedback control of the infrastructure system. In this case, the calculation unit 13 uses the state of the infrastructure system and the surrogate model to perform simulation for determining the control inputs, and calculates the risk and value of the surrogate model on the basis of the simulation results.

As another example, model prediction control when a formula is given for calculating how suitable a waveform is for longevity will be described. In the model prediction control, the model of the control target is used to generate candidates for waveforms of the control target and control inputs, and the optimal control input is calculated by calculating and optimizing the evaluation values of these waveforms. At this time, by using a surrogate model for predicting structural response as the model of the control target and the formula for calculating how suitable a waveform is for longevity, which is given for calculating the evaluation values, it is possible to utilize the surrogate model for structural response to perform control for achieving longevity.

In this manner, the calculation unit 13 may perform simulation for the case in which the control models are utilized. Examples of simulations to be performed by the calculation unit 13 include a simulation in which an observer is identified by a surrogate model of structural response, a simulation in which the control models are used to calculate feedforward control, and a simulation of model predictive control.

Figure 12:
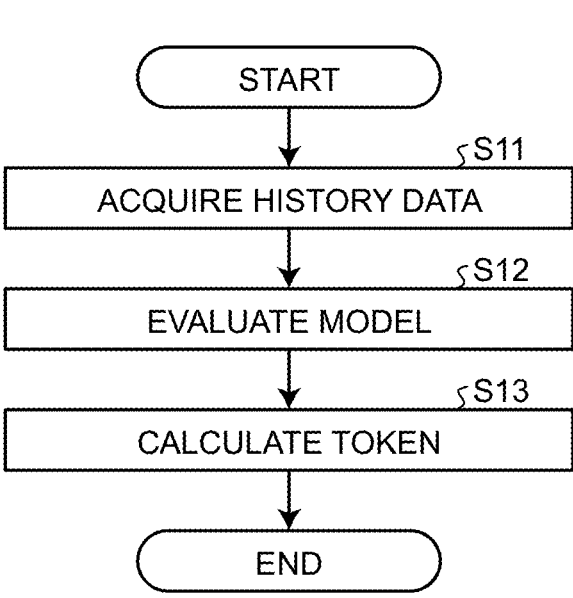
FIG. 12 is a flowchart illustrating an example of a token calculation method in the embodiment.

The following describes a token calculation method utilizing models and data. FIG. 12 is a flowchart illustrating an example of the token calculation method in the embodiment. To begin with, the token processing unit 14 acquires history data (step S11). For example, the history data includes model usage history (e.g., request history of a digital twin model when the digital twin model is used in a digital twin scenario).

The token processing unit 14 then evaluates the model on the basis of the history data at step S11 (step S12). The models are evaluated by, for example, the number of times the model is used and the importance of the model.

The token processing unit 14 then calculates a token that indicates an incentive for the model and data related to the model to be utilized, by a token calculation function for calculating a token based on the evaluation at step S12 (step S13).

To prevent violent fluctuations in token, the token calculation function may be preprocessed or data transformed by a relaxation function such as a moving-average or sigmoid function. The token processing unit 14 also manages the calculation function and parameter sets for the preprocessing by the distributed ledger.

Figure 13:
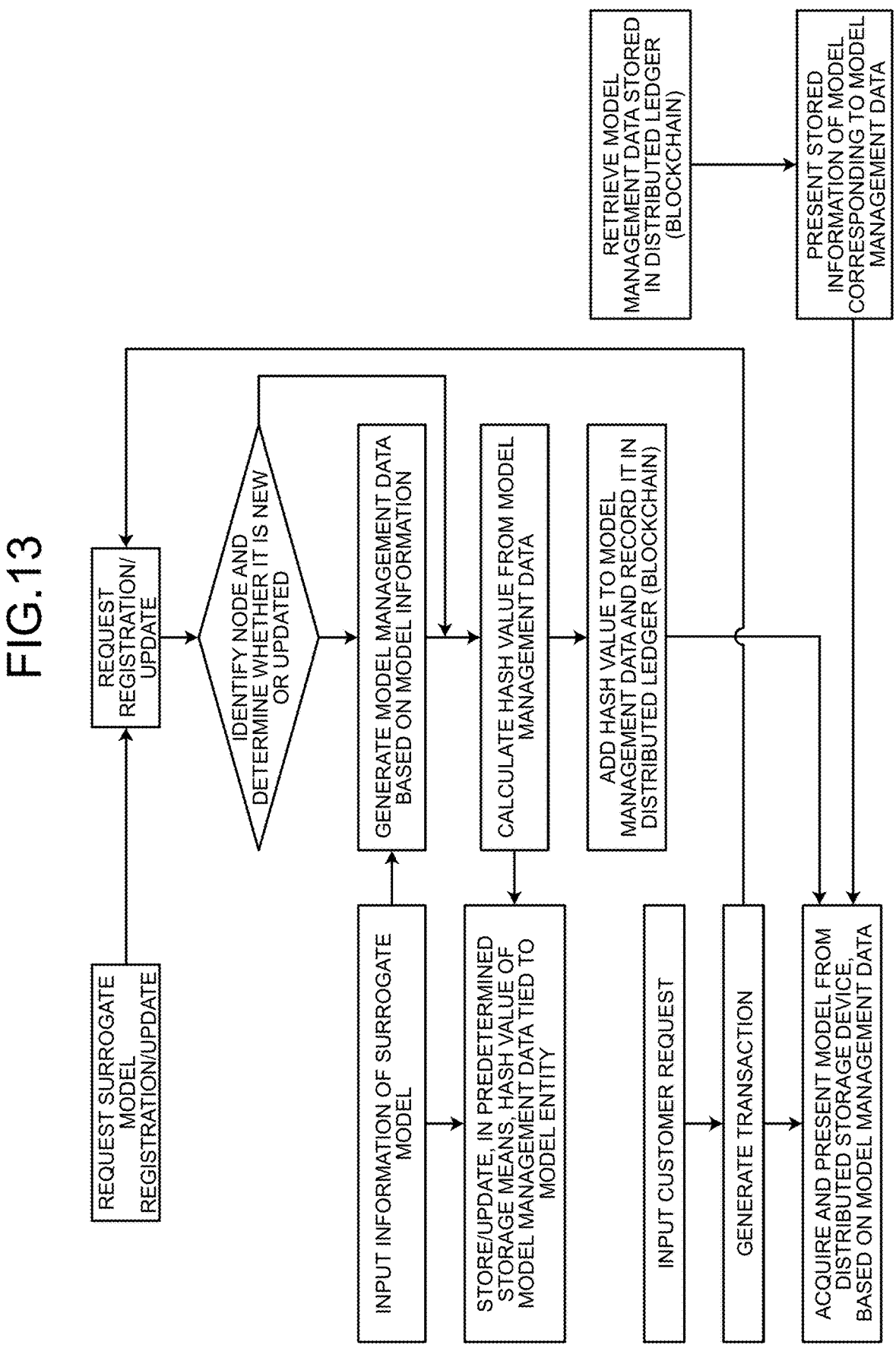
FIG. 13 is a diagram illustrating an example of a method of utilizing a digital twin model with the distributed ledger in the embodiment (in the case of a surrogate model)

The following describes a method of utilizing the digital twin model with the distributed ledger, with reference to the case of the surrogate model as an example. FIG. 13 is a diagram illustrating an example of the method of utilizing the digital twin model with the distributed ledger in the embodiment (in the case of the surrogate model). The example in FIG. 13 illustrates processes when surrogate model registration/update is requested, when information on the surrogate model is input, when a customer request is input, and when data for model management stored in the distributed ledger (blockchain) is retrieved.

Figure 14:
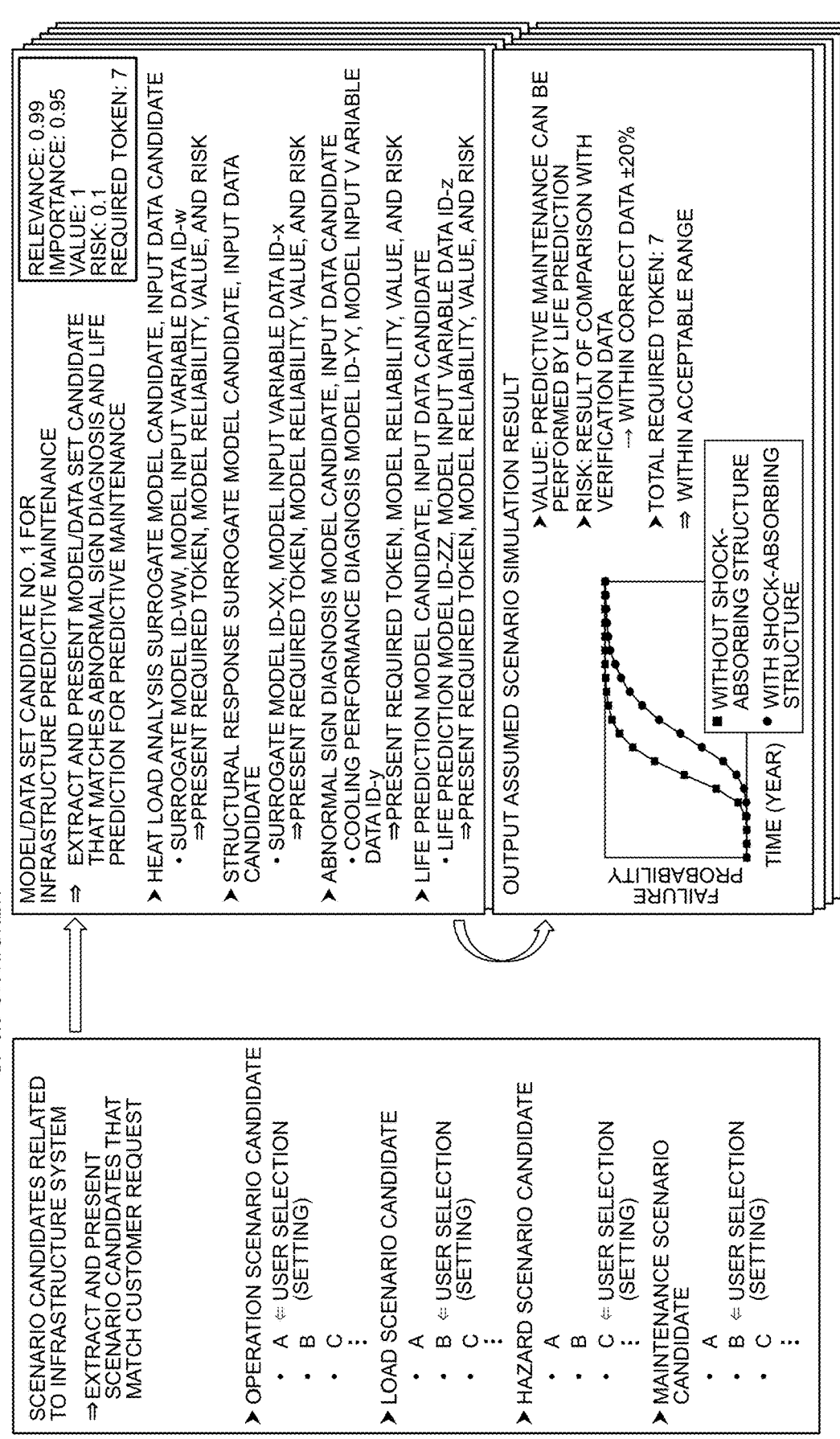
FIG. 14 is a diagram illustrating an example of UI that presents presentation information in the embodiment.

The following describes an example of a user interface (UI) for presenting scenarios, models and data (data sets). FIG. 14 is a diagram illustrating an example of the UI that presents presentation information in the embodiment.

The example in FIG. 14 illustrates an example when a plurality of candidates have been retrieved in the case of predictive maintenance of an infrastructure system. The presentation control unit 12 displays scenario candidates on a display device and receives, from a user, selection of the respective candidates for operation, load, hazard, and maintenance scenarios.

In the example in FIG. 14, the presentation control unit 12 presents model/data set candidates for predicting the breakage probability by life prediction and diagnosing abnormal signs (cooling performance diagnosis) for the selected scenario.

In the example in FIG. 14, the presentation control unit 12 also presents a candidate set with a relevance of 0.9 or higher and an importance of 0.9 or higher and a simulation result output in an assumed scenario.

In each model/data set candidate for infrastructure predictive maintenance, the relevance, the importance, value and risk indicators, and required tokens are also displayed. For example, model/data set candidate No. 1 for infrastructure predictive maintenance has Relevance: 0.99, Importance: 0.95, Value: 1, Risk: 0.1, and Required Tokens: 7.

For example, the numeral 1 indicating the indicator of the value of model/data set candidate No. 1 is based on the output of the value model. For example, the output of the value model is based on whether it is satisfied that the prediction about temporal changes in breakage probability by life prediction can be performed and the prediction about the dependence of the temporal changes in breakage probability on cooling performance can be performed (both predictions can be performed: 1, either one cannot be performed: 0).

As illustrated in FIG. 14, the presentation control unit 12 may display, on a display device or the like, display information for receiving selection of a scenario to be utilized from among one or more candidates of the scenario, and in response to the selection of a scenario to be utilized, may display display information including a combination of candidates of models and candidates of data and, for each combination, tokens, the value, and the risk.

As described above, in the model utilization system 1 according to the embodiment, the distributed ledger processing unit 11 processes a distributed ledger that stores a scenario to be used for analysis of a target system, a digital twin model to be used for the analysis, and data to be input to the digital twin model. The token processing unit 14 calculates a token that indicates an incentive for an organization that has provided the digital twin model to be utilized and an organization that has provided the data to be utilized. The presentation control unit 12 then retrieves, from the distributed ledger, a candidate of the scenario that satisfies a user request, a candidate of the digital twin model that satisfies the user request, and a candidate of the data that satisfies the user request, presents the retrieved candidate of the scenario, the retrieved candidate of the digital twin model, and the retrieved candidate of the data, and presents the token required to use a combination of the retrieved candidate of the digital twin model and the retrieved candidate of the data.

By this configuration of the model utilization system 1 according the embodiment, it is possible to more efficiently utilize the digital twin model while guaranteeing credit enhancement. Specifically, with the model utilization system 1 according to the embodiment, it is possible to provide, for example, (1) a mechanism that can guarantee credit enhancement for model utilization, (2) a mechanism for calculating and distributing tokens that will benefit organizations that have provided data and models, and (3) a mechanism for creating important scenarios and extracting models and data sets related to those scenarios.

The following describes an example of a hardware configuration of the model utilization system 1 according to the embodiment.

Example of Hardware Configuration

Figure 15:
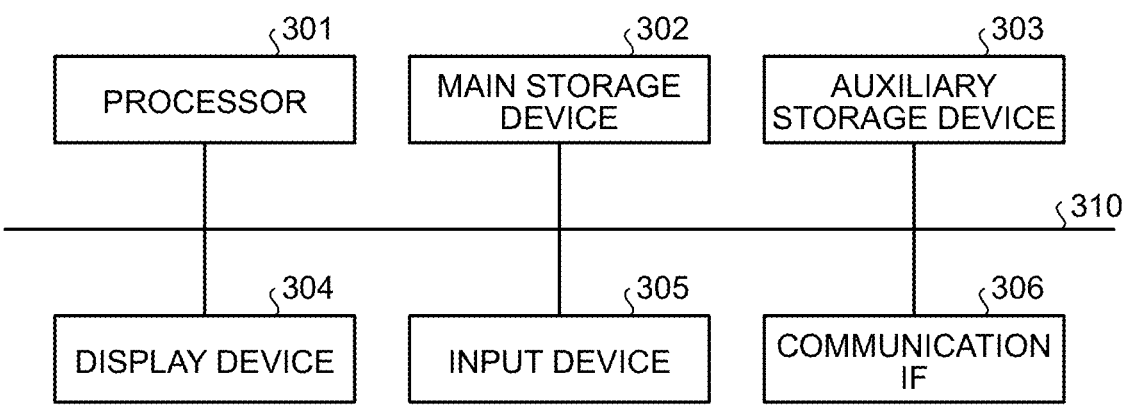
FIG. 15 is a diagram illustrating an example of a hardware configuration of the model utilization system according to the embodiment.

FIG. 15 is a diagram illustrating an example of a hardware configuration of the model utilization system 1 according to the embodiment. The model utilization system 1 is provided with, for example, one or more computers (information processors) including a processor 301, a main storage device 302, an auxiliary storage device 303, a display device 304, an input device 305, and a communication IF 306. The processor 301, the main storage device 302, the auxiliary storage device 303, the display device 304, the input device 305, and the communication IF 306 are connected via a bus 310.

The processor 301 executes a computer program read from the auxiliary storage device 303 into the main storage device 302. The main storage device 302 is a memory such as a read only memory (ROM) and a random access memory (RAM). The auxiliary storage device 303 is a hard disk drive (HDD), a solid state drive (SSD), or a memory card, for example.

The display device 304 displays the presentation information and other information described above. The input device 305 receives inputs from users. The model utilization system 1 does not have to include the display device 304 and the input device 305.

The communication IF 306 is an interface for communicating with other devices. If the model utilization system 1 is not include the display device 304 and the input device 305, for example, the display and input functions of an external terminal connected via the communication IF 306 may be used.

The computer program to be executed by the model utilization system 1 may be provided as a computer program product in an installable or executable format file recorded on a computer-readable storage medium such as a CD-ROM, a memory card, a CD-R, and a digital versatile disc (DVD).

The computer program to be executed by the model utilization system 1 may be configured to be stored on a computer connected to a network such as the Internet and to be provided by being downloaded via the network.

The computer program to be executed by the model utilization system 1 may be configured to be provided via a network such as the Internet without being downloaded.

The computer program to be executed by the model utilization system 1 may be configured to be provided in a manner preinstalled in a ROM, for example.

The computer program executed by the model utilization system 1 has a module configuration including functions that can be implemented by the computer program among the functional structures of the model utilization system 1 described above. The functions implemented by the computer program are loaded into the main storage device 302 when the processor 301 reads and executes the computer program from a storage medium such as the auxiliary storage device 303. In other words, the functions implemented by the computer program are generated on the main storage device 302.

Some or all of the functions of the model utilization system 1 may be implemented by hardware such as an integrated circuit (IC). The IC is, for example, a processor that performs dedicated processing.

When a plurality of processors are used to implement the respective functions, each processor may implement one of the functions, or may implement two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A model utilization system comprising:
a memory; and
one or more processors coupled to the memory and configured to:
perform processing of a distributed ledger configured to store a scenario to be used for analysis of a target system, a digital twin model to be used for the analysis, and data to be input to the digital twin model;
calculate a token that indicates an incentive for an organization that has provided the digital twin model to be utilized and for an organization that has provided the data to be utilized; and
retrieve, from the distributed ledger, a candidate of the scenario that satisfies a user request, a candidate of the digital twin model that satisfies the user request, and a candidate of the data that satisfies the user request, present the candidate of the scenario retrieved, the candidate of the digital twin model retrieved, and the candidate of the data retrieved, and present a token required to use a combination of the candidate of the digital twin model retrieved and the candidate of the data retrieved, wherein
the target system includes an infrastructure system,
the data includes at least one of a usage history of the infrastructure system, a load history of the infrastructure system, and monitoring data of the infrastructure system, and
the digital twin model includes a surrogate model to be used for at least one of diagnosis of an abnormal sign of the infrastructure system, life prediction of the infrastructure system, and failure risk prediction of the infrastructure system, wherein
the one or more processors are further configured to:
calculate, based on the candidate of the scenario, a risk calculated from the candidate of the digital twin model and a value indicating usefulness of the candidate of the digital twin model;
retrieve the candidate of the digital twin model for which the risk and the value satisfy the user request;
calculate an indicator expressed in a probability distribution by performing simulation using the candidate of the digital twin model and the candidate of the data, based on the candidate of the scenario;
calculate model reliability of the digital twin model by uncertainty evaluation based on the indicator; and
calculate the risk to be higher as the model reliability is lower; and
wherein the surrogate model includes a model generated from a function candidate library based on the user request.

2. The system according to claim 1, wherein the one or more processors are configured to: calculate an indicator expressed in a probability distribution by performing simulation using the candidate of the digital twin model and the candidate of the data, based on the candidate of the scenario; and calculate the risk, based on probability of occurrence of an event in the probability distribution in which the indicator falls outside an acceptable range determined according to the user request, or based on a product obtained by multiplying loss cost by the probability of occurrence of the event in the probability distribution in which the indicator falls outside the acceptable range.

3. The system according to claim 1, wherein the one or more processors are configured to: calculate an indicator expressed in a probability distribution by performing simulation using the candidate of the digital twin model and the candidate of the data, based on the candidate of the scenario; and calculate the value based on at least one of an expected value and an average value of the indicator.

4. The system according to claim 1, wherein the one or more processors are configured to: calculate an indicator expressed in a probability distribution by performing simulation using the candidate of the digital twin model and the candidate of the data, based on the candidate of the scenario; calculate model reliability by uncertainty evaluation based on the indicator; and calculate the value to be higher as the model reliability is higher.

5. The system according to claim 1, wherein the one or more processors are configured to: calculate a first importance of the candidate of the digital twin model to be higher as usage histories of the candidate of the digital twin model are more; calculate a second importance of the candidate of the data to be higher as usage histories of the candidate of the data is more; and calculate the value to be higher as the first and second importances are higher.

6. The system according to claim 1, wherein the one or more processors are configured to: display, on a display device, display information of receiving selection of a scenario to be utilized from among one or more candidates of the scenario; and display, in response to the selection of the scenario to be utilized, on the display device, display information that presents a combination of the candidate of the digital twin model and the candidate of the data, and for each combination, the token, the value, and the risk.

7. The system according to claim 1, wherein the processing of the distributed ledger includes at least one of processes of: authentication of a user accessing the distributed ledger; access control of the distributed ledger according to authority of the user; consensus building; transaction execution; fee determination; registration of a block in the distributed ledger; and mining of the distributed ledger.

8. The system according to claim 1, wherein
the target system includes an infrastructure system,
the digital twin model includes a surrogate model to be used to calculate control input for feedback control of the infrastructure system, and
the one or more processors are configured to perform simulation of determining the control input by using a state of the infrastructure system and the surrogate model, and calculate a risk and a value of the surrogate model based on a result of the simulation.

9. The system according to claim 1, wherein
the target system includes an infrastructure system,
the digital twin model includes a surrogate model to be used to calculate control input for feedforward control of the infrastructure system, and
the one or more processors are configured to perform simulation of predicting a state of the infrastructure system and determining the control input by using the surrogate model in an observer for the feedforward control, and calculate a risk and a value of the surrogate model based on a result of the simulation.

10. A model utilization method comprising:
performing, by a model utilization system, processing of a distributed ledger configured to store a scenario to be used for analysis of a target system, a digital twin model to be used for the analysis, and data to be input to the digital twin model;

calculating, by the model utilization system, a token that indicates an incentive for an organization that has provided the digital twin model to be utilized and for an organization that has provided the data to be utilized; and retrieving, by the model utilization system, from the distributed ledger, a candidate of the scenario that satisfies a user request, a candidate of the digital twin model that satisfies the user request, and a candidate of the data that satisfies the user request, presenting the candidate of the scenario retrieved, the candidate of the digital twin model retrieved, and the candidate of the data retrieved, and presenting a token required to use a combination of the candidate of the digital twin model retrieved and the candidate of the data retrieved, wherein the target system includes an infrastructure system, the data includes at least one of a usage history of the infrastructure system, a load history of the infrastructure system, and monitoring data of the infrastructure system, and the digital twin model includes a surrogate model to be used for at least one of diagnosis of an abnormal sign of the infrastructure system, life prediction of the infrastructure system, and failure risk prediction of the infrastructure system; and further comprising:

calculating, based on the candidate of the scenario, a risk calculated from the candidate of the digital twin model and a value indicating usefulness of the candidate of the digital twin model;

retrieving the candidate of the digital twin model for which the risk and the value satisfy the user request;

calculating an indicator expressed in a probability distribution by performing simulation using the candidate of the digital twin model and the candidate of the data, based on the candidate of the scenario;

calculating model reliability of the digital twin model by uncertainty evaluation based on the indicator; and calculating the risk to be higher as the model reliability is lower; and wherein the surrogate model includes a model generated from a function candidate library based on the user request.

11. A computer program product comprising a non-transitory computer-readable medium including programmed instructions, the instructions causing a computer to execute:

performing processing of a distributed ledger configured to store a scenario to be used for analysis of a target system, a digital twin model to be used for the analysis, and data to be input to the digital twin model;

calculating a token that indicates an incentive for an organization that has provided the digital twin model to be utilized and for an organization that has provided the data to be utilized; and retrieving, from the distributed ledger, a candidate of the scenario that satisfies a user request, a candidate of the digital twin model that satisfies the user request, and a candidate of the data that satisfies the user request, and presenting the candidate of the scenario retrieved, the candidate of the digital twin model retrieved, and the candidate of the data retrieved, and presenting a token required to use a combination of the candidate of the digital twin model retrieved and the candidate of the data retrieved, wherein the target system includes an infrastructure system, the data includes at least one of a usage history of the infrastructure system, a load history of the infrastructure system, and monitoring data of the infrastructure system, and the digital twin model includes a surrogate model to be used for at least one of diagnosis of an abnormal sign of the infrastructure system, life prediction of the infrastructure system, and failure risk prediction of the infrastructure system; and further causing the computer to execute:

calculating, based on the candidate of the scenario, a risk calculated from the candidate of the digital twin model and a value indicating usefulness of the candidate of the digital twin model;

retrieving the candidate of the digital twin model for which the risk and the value satisfy the user request;

calculating an indicator expressed in a probability distribution by performing simulation using the candidate of the digital twin model and the candidate of the data, based on the candidate of the scenario;

calculating model reliability of the digital twin model by uncertainty evaluation based on the indicator; and calculating the risk to be higher as the model reliability is lower; and wherein the surrogate model includes a model generated from a function candidate library based on the user request.

* * * * *